United States Patent
Hotta

[19]
[11] Patent Number: 5,959,249
[45] Date of Patent: Sep. 28, 1999

[54] DRAIN STRUCTURE FOR ELECTRIC CONNECTION BOX

[75] Inventor: Daiji Hotta, Shizuoka-ken, Japan

[73] Assignee: Yazaki Corporation, Tokyo, Japan

[21] Appl. No.: 09/015,510

[22] Filed: Jan. 29, 1998

[30] Foreign Application Priority Data

Feb. 24, 1997 [JP] Japan .................................. P 9-39315

[51] Int. Cl.⁶ .................................................. H02G 3/08
[52] U.S. Cl. .............................. 174/60; 220/371; 405/52; 405/303; 174/50
[58] Field of Search ................................. 174/50, 59, 60, 174/48, 49; 52/169.5, 302.7, 302.1, 209, 204.52; 220/371, 372; 405/50, 52, 303

[56] References Cited

U.S. PATENT DOCUMENTS

| | | | |
|---|---|---|---|
| 2,021,912 | 11/1935 | Edmonds | 174/59 |
| 2,402,840 | 6/1946 | Olley | 174/50 |
| 2,405,927 | 8/1946 | Tornblom | 138/42 |
| 2,434,102 | 1/1948 | Channell | 174/59 |
| 3,356,255 | 12/1967 | Zavertnik et al. | 220/88.2 |
| 5,159,155 | 10/1992 | Nishihara | 174/50 |

FOREIGN PATENT DOCUMENTS

| | | |
|---|---|---|
| 56-136429 | 10/1981 | Japan . |
| 62-19024 | 2/1987 | Japan . |
| 1-93912 | 6/1989 | Japan . |
| 1-135783 | 9/1989 | Japan . |
| 3-34618 | 4/1991 | Japan . |
| 3-48322 | 5/1991 | Japan . |
| 3-83419 | 8/1991 | Japan . |
| 3-53538 | 11/1991 | Japan . |

*Primary Examiner*—Dean A. Reichard
*Attorney, Agent, or Firm*—Finnegan, Henderson, Farabow, Garrett & Dunner, L.L.P.

[57] ABSTRACT

In a drain structure for an electric connection box, a drain hole (5) for discharging water permeating within a case (4) is provided in a bottom wall (4a) of the case (4) of an electric connection box (1) having a terminal insertion port (3b) of a terminal receiving portion (3); and a permeation prevention wall (6) for preventing the water discharged from the drain hole (5) from permeating within the terminal receiving portion (3) is provided at least in a portion between a discharge port (5a) of the dram hole (5) and the terminal insertion port (3b) of bottom wall surface (4b) close to the discharge port (5a) of the drain hole (5) in a projecting manner.

3 Claims, 2 Drawing Sheets

DRAIN STRUCTURE FOR ELECTRIC CONNECTION BOX

BACKGROUND OF THE INVENTION

1. Field of the Invention

The present invention relates to a drain structure for an electric connection box such as a relay box, a branch connection box and the like.

2. Description of the Related Art

In a related art, a terminal receiving portion for receiving a female terminal connecting to a relay terminal is provided in a relay attachment portion in a relay box to which a relay is attached, and a swingable terminal locking portion for locking a female terminal is formed in the terminal receiving portion.

A drain hole for discharging a water permeating within the relay attachment portion is provided in a bottom wall of the relay attachment portion in a case of the relay box in such a manner as to extend therethrough, and a terminal insertion port of the terminal receiving portion is open to a portion near a discharge port of the drain hole.

In the case that the relay box is, for example, used for an automotive vehicle, the water discharged from the discharge port of the drain hole is spattered by a wind due to running of the automotive vehicle, and is flown to the terminal insertion port after passing along the bottom wall surface close to the discharge port of the drain hole or is flied to the terminal insertion port, and then is permeated within the terminal receiving portion from the terminal insertion port, so that there is a risk that the water causes a short circuit within the terminal receiving portion.

SUMMARY OF THE INVENTION

The present invention has been achieved with such points in view.

It therefore is an object of the present invention to provide a drain structure for an electric connection box which can solve a risk that a water discharged from a drain hole causes a short circuit within a terminal receiving portion.

To achieve the object, according to a first aspect of the present invention, there is provided a drain structure for an electric connection box comprising: a case having a bottom wall; and a terminal receiving portion mounted in the case, wherein a terminal insertion port of the terminal receiving portion is formed in the bottom wall of the case; wherein a drain hole to discharge a water permeating within the case is formed in the bottom wall; and wherein a permeation prevention wall is provided on a bottom wall surface of the bottom wall including a discharge port of the drain hole at least between the discharge port and the terminal insertion port in a projecting manner, and the permeation prevention wall prevents the water discharged through the drain hole from permeating into the terminal receiving portion through the terminal insertion port.

In accordance with the first aspect of the present invention, even when the water discharged from the discharge port of the drain hole is spattered toward the terminal insertion port by the wind or the like, the water flow toward the terminal insertion port after passing along the bottom wall surface close to the discharge port of the drain hole is prevented from reaching the terminal insertion port by the permeation prevention wall provided at least in the portion between the terminal insertion port and the discharge port of the drain hole in the bottom wall surface, and the splash toward the terminal insertion port is also prevented from reaching the terminal insertion port by the permeation prevention wall.

Accordingly, even when the water discharged from the discharge port of the drain hole is spattered toward the terminal insertion port by the wind or the like, it is prevented that the water permeates within the terminal receiving portion from the terminal insertion port, so that the short circuit within the terminal receiving portion due to the permeation can be prevented.

According to a second aspect of the present invention, as it depends from the first aspect, the permeation prevention wall is provided near the terminal insertion port in the bottom wall surface.

In accordance with the second aspect, it is prevented that the water discharged from the discharge port of the drain hole permeates within the terminal receiving portion from the terminal insertion port.

Accordingly, the permeation can be securely prevented, so that the short circuit within the terminal receiving portion due to the permeation can be securely prevented.

According to a third aspect of the present invention, as it depends from the first or the second aspect, the permeation prevention wall is provided in the wholly peripheral portions of the discharge port in the bottom wall surface.

In accordance with the third aspect, in the water discharged from the discharge port of the drain hole, the water flow toward the terminal insertion port is shut by the permeation prevention wall provided in all the periphery of the discharge port in a projecting manner and the splash toward the terminal insertion port is also prevented from flying.

Accordingly, it can be securely prevented that the water discharged from the discharge port of the drain hole permeates within the terminal receiving portion from the terminal insertion port, so that the short circuit within the terminal receiving portion due to the permeation can be securely prevented.

In this case, since the permeation prevention wall is provided in all the periphery of the discharge port in the bottom wall surface close to the discharge port of the drain hole in a projecting manner, the permeation prevention wall can compensates a lowering of a strength of the bottom wall near the drain hole due to forming the drain.

Further, since the permeation prevention wall is provided in all the periphery of the discharge port in the bottom wall surface close to the discharge port of the drain hole, even when the water such as a rain drop and the like attached to the wall surface close to the discharge port of the drain hole in the case of the electric connection box flows toward the drain hole after flowing along the wall surface, the water flow can be shut by the periphery of the drain hole. As a result, it can be prevented that the water flowing along the wall surface permeates within the case from the drain hole.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 1 is a cross sectional view which shows an embodiment realizing a drain structure in accordance with the present invention; and FIG. 2 is a cross sectional view which shows another embodiment.

DETAILED DESCRIPTION OF THE PREFERRED EMBODIMENTS

Figure 1:
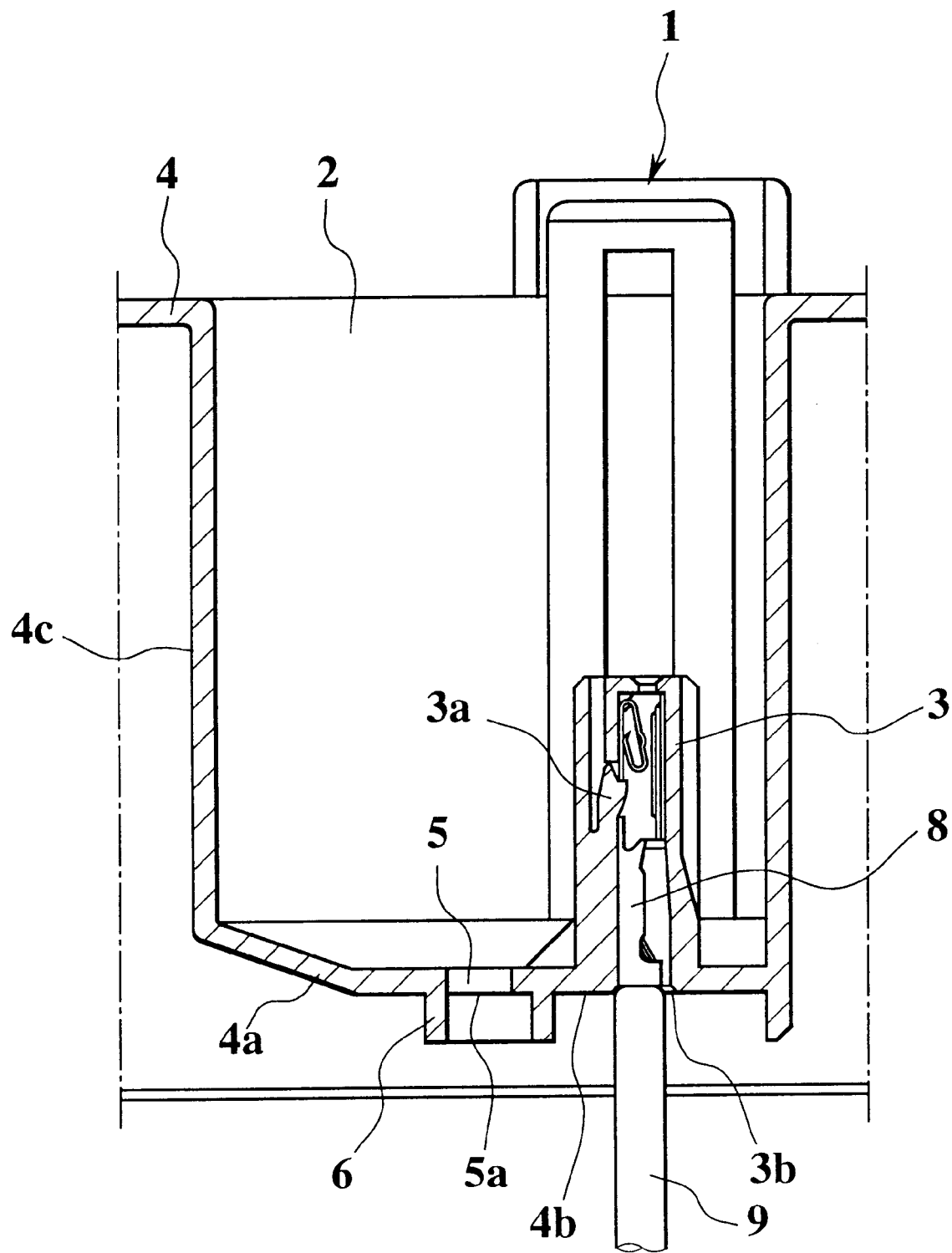

There will be detailed below the preferred embodiments of the present invention with reference to the accompanying drawings. Like members are designated by like reference characters.

FIG. 1 is a view showing an embodiment realizing both inventions stated in claims 1 and 3, which shows a relay attachment portion 2 of a relay box 1 to which a relay is attached.

A terminal receiving portion 3 for receiving a female terminal 8 connected to a relay terminal is provided in the relay attachment portion 2, a swingable terminal engagement portion 3a for locking the female terminal 8 is formed in the terminal receiving portion 3, and the female terminal 8 press-fitted to a lead wire 9 is received so as to be locked to the terminal locking portion 3a.

A drain hole 5 for discharging a water permeating within the relay attachment portion 2 is provided in a bottom wall 4a of the relay attachment portion 2 in a case 4 of the relay box 1 in a projecting manner, a terminal insertion port 3b of the terminal receiving portion 3 is open to a portion near a discharge port 5a of the drain hole 5, and a permeation prevention wall 6 for preventing the water discharged from the drain hole 5 from permeating within the terminal receiving portion 3 from the terminal insertion port 3b is provided in a bottom wall surface 4b close to the discharge port 5a of the drain hole 5 all around the periphery of the discharge port 5a in a projecting manner.

In the relay box 1 mentioned above, even when the water discharged from the discharge port 5a of the drain hole 5 is spattered toward the terminal insertion port 3b by the wind or the like, the water flow toward the terminal insertion port 3b after flowing along the bottom wall surface 4b in the spattered water is shut by the permeation prevention wall 6 provided in all the periphery of the discharge port 5a in the bottom wall surface 4b close to the discharge port 5a of the drain hole 5, and the splash toward the terminal insertion port 3b is prevented from flying.

Accordingly, in the relay box 1, it can be securely prevented that the water discharged from the discharge port 5a of the drain hole 5 permeates within the terminal receiving portion 3 from the terminal insertion port 3b and a short circuit within the terminal receiving portion 3 due to the permeation can be securely prevented.

Further, in the relay box 1, since the permeation prevention wall 6 is provided in all the periphery of the discharge port 5a in the bottom wall surface 4b close to the discharge port 5a of the drain hole 5 in a projecting manner, the permeation prevention wall 6 can be compensate a lowering of a strength of the bottom wall 4a near the drain hole 5 due to forming the drain hole 5.

Still further, in the relay box 1, since the permeation prevention wall 6 is provided in all the periphery of the discharge port 5a in the bottom wall surface 4b close to the discharge port 5a iof the drain hole 5 in a projecting manner, even when the water such as a rain drop and the like attached not only to the bottom wall surface 4b close to the discharge port 5a of the drain hole 5 but also to a case wall surface 4c close to the discharge port 5a of the drain hole 5 flows toward the drain hole 5 after flowing along the case wall surface 4c, the water flow can be shut in the periphery of the drain hole 5. As a result, it can be prevented that the water flowing along the case wall surface 4c permeates within the relay attachment portion 2 from the drain hole 5.

Figure 2:
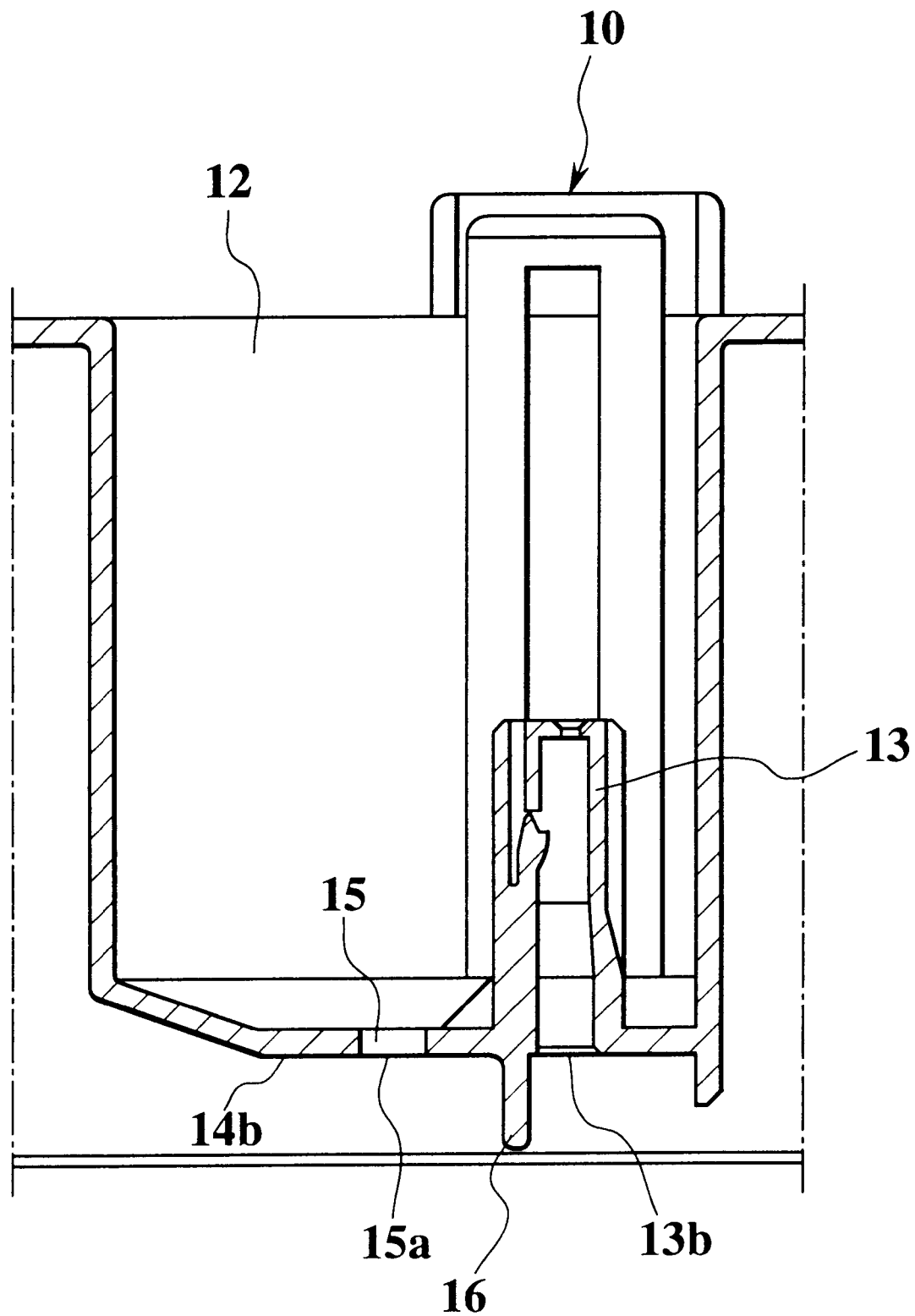

FIG. 2 shows an embodiment realizing both Inventions stated in claims 1 and 2. A relay attachment portion 12 of a relay box 10 shown in this drawing is different from the relay attachment portion 2 of the relay box 1 shown in FIG. 1 in view that in the relay box 1, the permeation prevention wall 6 is provided in all the periphery of the discharge port 5a in the bottom wall surface 4b close to the discharge port 5a of the drain hole 5 in a projecting manner and in comparison with this, in the relay box 10, a permeation prevention wall 16 is provided near a terminal insertion port 13b disposed between a discharge port 15a in a bottom wall surface 14b close to a discharge port 15a of a drain hole 15 and the terminal insertion port 13b in a projecting manner.

In the relay box 10, even when the water discharged from the discharge port 15a of the drain hole 15 is spattered toward the terminal insertion port 13b by the wind or the like, the water flow toward the terminal insertion port 13b after flowing along the bottom wall surface 14b in the spattered water is shut by the permeation prevention wall 16 provided near the terminal insertion port 13b disposed between the discharge port 15a in the bottom wall surface 14b close to the discharge port 15a of the drain hole 15 and the terminal insertion port 13b in a projecting manner, and the splash toward the terminal insertion port 13b is also prevented from flying.

Accordingly, in the relay box 10, as in the same manner as the relay box 1, it can be securely prevented that the water discharged from the discharge port 15a of the drain hole 15 permeates within the terminal receiving portion 13 from the terminal insertion port 13b and a short circuit within the terminal receiving portion 13 due to the permeation can be securely prevented.

In the embodiment mentioned above, the relay box is employed for the electric connection box, however, the electric connection box is not limited to the relay box, for example, a branch connection box and the like may be of course employed.

While preferred embodiments of the present invention have been described using specific terms, such description is for illustrative purposes, and it is to be understood that changes sand variations may be made without departing from the spirit or scope of the following claims.

What is claimed is:

1. A drain structure for an electric connection box comprising:

a case having a bottom wall; and a terminal receiving portion mounted in the case, wherein a terminal insertion port of the terminal receiving portion is formed in the bottom wall of the case;

wherein a drain hole to discharge a water permeating within the case is formed in the bottom wall; and wherein a permeation prevention wall is provided on a bottom wall surface of the bottom wall including a discharge port of the drain hole at least between the discharge port and the terminal, insertion port in a projecting manner, and the permeation prevention wall prevents the water discharged through the drain hole from permeating into the terminal receiving portion through the terminal insertion port.

2. The drain structure for an electric connection box according to claim 1, wherein the permeation prevention wall is provided near the terminal insertion port in the bottom wall surface.

3. The drain structure for an electric connection box according to claim 1, wherein the permeation prevention wall completely surrounds the discharge port in the bottom wall surface.

* * * * *

UNITED STATES PATENT AND TRADEMARK OFFICE
CERTIFICATE OF CORRECTION

PATENT NO.   : 5,959,249                                     Page 1 of 1
DATED        : September 28, 1999
INVENTOR(S)  : Daiji Hotta It is certified that error appears in the above-identified patent and that said Letters Patent is hereby corrected as shown below:

Title page,
Item [57], ABSTRACT,
Line 10, before "bottom", insert -- a --.

Column 4,
Line 53, after "terminal", delete ",".

Signed and Sealed this

Fourteenth Day of January, 2003

JAMES E. ROGAN
*Director of the United States Patent and Trademark Office*